United States Patent [19]

Stone

[11] Patent Number: 5,032,749
[45] Date of Patent: Jul. 16, 1991

[54] ELECTRIC MOTOR

[75] Inventor: Thomas W. Stone, Owosso, Mich.

[73] Assignee: Magnetek Universal Electric, Owosso, Mich.

[21] Appl. No.: 470,617

[22] Filed: Jan. 26, 1990

[51] Int. Cl.$^5$ .......................................... H02K 11/00
[52] U.S. Cl. .................................. 310/68 C; 310/71; 310/254
[58] Field of Search ............... 310/68 C, 71, 43, 258, 310/172, 179, 180, 184, 208, 254, 42, 44; 361/23-25, 41; 337/405, 416

[56] References Cited

U.S. PATENT DOCUMENTS

| | | | |
|---|---|---|---|
| 1,075,882 | 10/1913 | Walters | 310/68 C |
| 2,827,583 | 3/1958 | Hoddy | 310/172 |
| 3,567,973 | 3/1971 | Mastrodonato, Sr. | 310/89 |
| 3,974,407 | 8/1976 | Dochtermann | 310/71 |
| 3,975,654 | 8/1976 | Dryburgh | 310/172 |
| 4,181,393 | 1/1980 | Lill | 310/68 C |
| 4,188,553 | 2/1980 | Wheaton | 310/68 C |
| 4,236,092 | 11/1980 | Di Flora | 310/68 C |
| 4,250,419 | 2/1981 | Zolman | 310/68 C |
| 4,641,121 | 2/1987 | Boulanger | 310/68 C |
| 4,791,329 | 12/1988 | Ubukata | 310/68 C |
| 4,893,041 | 1/1990 | Snider | 310/172 |

FOREIGN PATENT DOCUMENTS 0952734 11/1956 Fed. Rep. of Germany .... 310/68 C

Primary Examiner—R. Skudy
Attorney, Agent, or Firm—Barnes, Kisselle, Raisch, Choate, Whittemore & Hulbert

[57] ABSTRACT

An electric motor comprising a stator having a plurality of radially inwardly extending circumferentially spaced polar segments. A coil is wound around each stator segment. A unitary motor overload assembly is provided and connected by a standard lead from one of the coils and by a solid uninsulated conductor lead to the other of the coils. The cross-section of the solid conductor is such that the motor will operate satisfactorily during normal running or locked rotor condition but would open by melting in the event of a winding failure of the coils which would normally result in higher than normal operating currents in the winding.

2 Claims, 3 Drawing Sheets

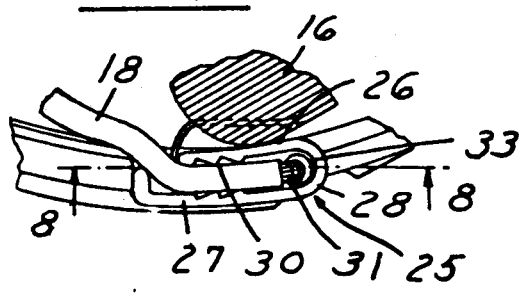
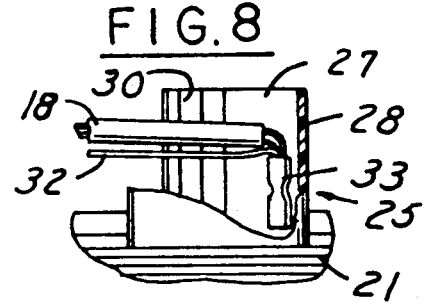
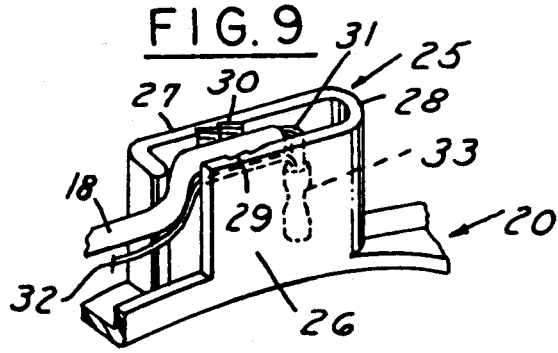
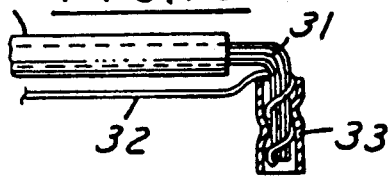

ELECTRIC MOTOR

This invention relates to electric motors.

BACKGROUND AND SUMMARY OF THE INVENTION

Electric motors conventionally comprise a housing, a stator in the housing and a rotor rotatably mounted in the housing and adapted to be rotated when the electrical power is supplied to the stator. The stator may comprise a plurality of laminations which, in turn, support a plurality of windings. Such a motor further includes a strain relief device which isolates the external leads from the wiring of the stator.

In an electric motor such as shaded pole motor, for example, the stator may have two or more integral segments extending radially inwardly and a coil may be wound about each of the segments. In the manufacture of stators, it is common to apply an insulator coating such as an epoxy coating to the stator before the coil is wound about the segment of the stator to isolate the windings of the coil from the metal of the stator.

In such electric motors, it is common to provide a protector between at least one pair of coils, such as bi-metallic devices, to open and close the winding at a pre-set calibration temperature and thereby prevent the electric motor from overheating in a locked condition. Electric motors having 45 watts or more input require cooling from the operating load or from an internal fan to protect the motor from overheating during the running cycle. If for any reason the motor is unable to run, either from bearing failure or from lock-up of load, the cooling system becomes inoperative and the current in the motor increases from 150 to 300 percent of the rated input power.

Where the electric motor is installed in a secluded location and the motor has an automatic thermostatic device which does not alert anyone that the motor is locked -up and is cycling on the overload mode, the overload device will fail in a closed circuit mode allowing the locked rotor to increase and accelerate the increase in temperature.

In accordance with the invention, a unitary motor overload assembly is provided and connected by a standard insulated lead from one of the coils and by a solid uninsulated conductor lead to the other of the coils, the cross-section of the solid conductor being such that the motor will operate satisfactorily during normal running or locked rotor condition but would open by melting in the event of a winding failure of the coils which would normally result in higher than normal operating currents in the winding.

The invention has particular utility in connection with the electric motor shown in the patent application filed concurrently herewith entitled "ELECTRIC MOTOR", Case R-675, Ser. No. 07/470,618, filed Jan. 26, 1990, having a common assignee with the present application, wherein the electric motor comprises a stator having a plurality of radially inwardly extending circumferentially spaced polar segments and a plastic stator member on each axial end of the stator. Each member has substantially the same configuration as the cross sectional configuration of the ends of the stator, including segment portions overlying the segments of the stator. Each segment portion includes an axially outwardly extending wall and a coil is wound around each stator segment and segment portion of said stator member. Integral strain relief portions are provided on each stator member for connecting the coils and for connecting power leads to the ends.

DESCRIPTION OF THE DRAWINGS

FIG. 7 is a fragmentary view on an enlarged scale showing a portion of the integral strain relief connection.

FIG. 8 is a fragmentary sectional view taken along the line 8—8 in FIG. 7.

FIG. 9 is a fragmentary perspective view of the integral strain relief connector.

FIG. 10 is a view of the connector leads prior to application to the strain relief connector.

DESCRIPTION

Figure 1:
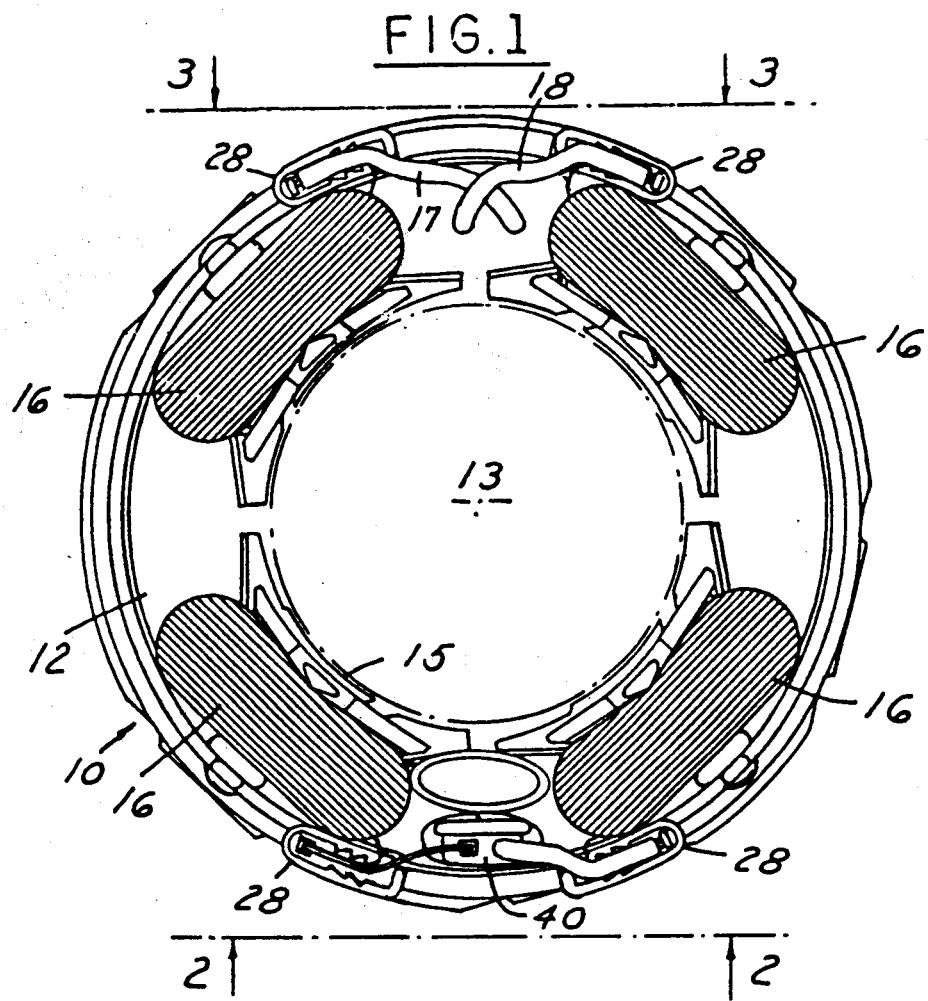
FIG. 1 is an end view of an electric motor embodying the invention with the end member removed.
Figure 2:
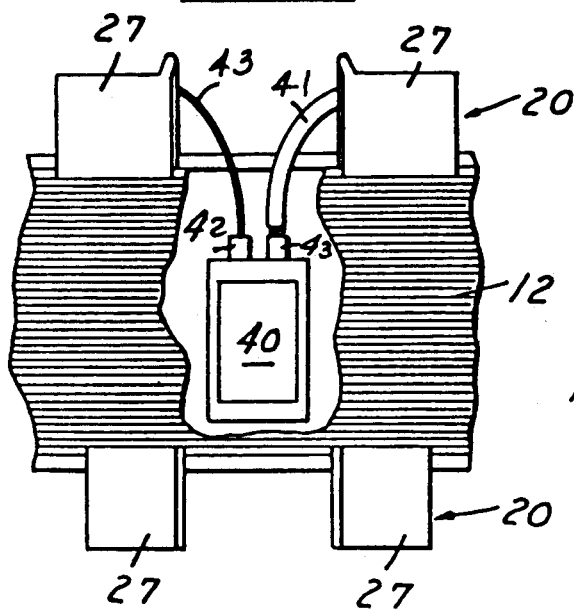
FIG. 2 is a fragmentary part sectional view taken along the line 2—2 in FIG. 2.
Figure 3:
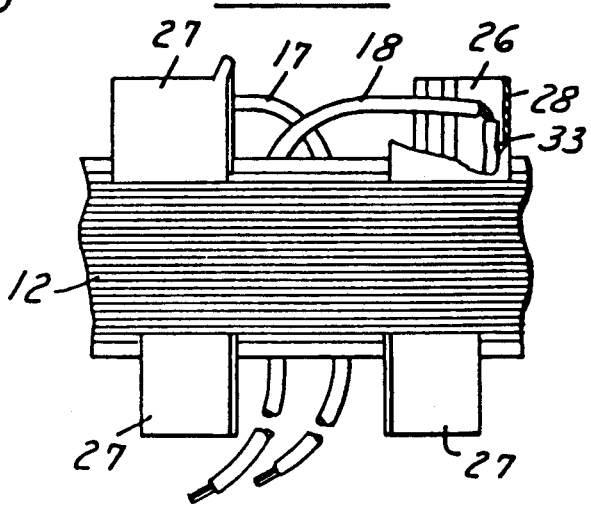
FIG. 3 is a fragmentary part sectional view taken along the line 3—3 in FIG. 2.
Figure 4:
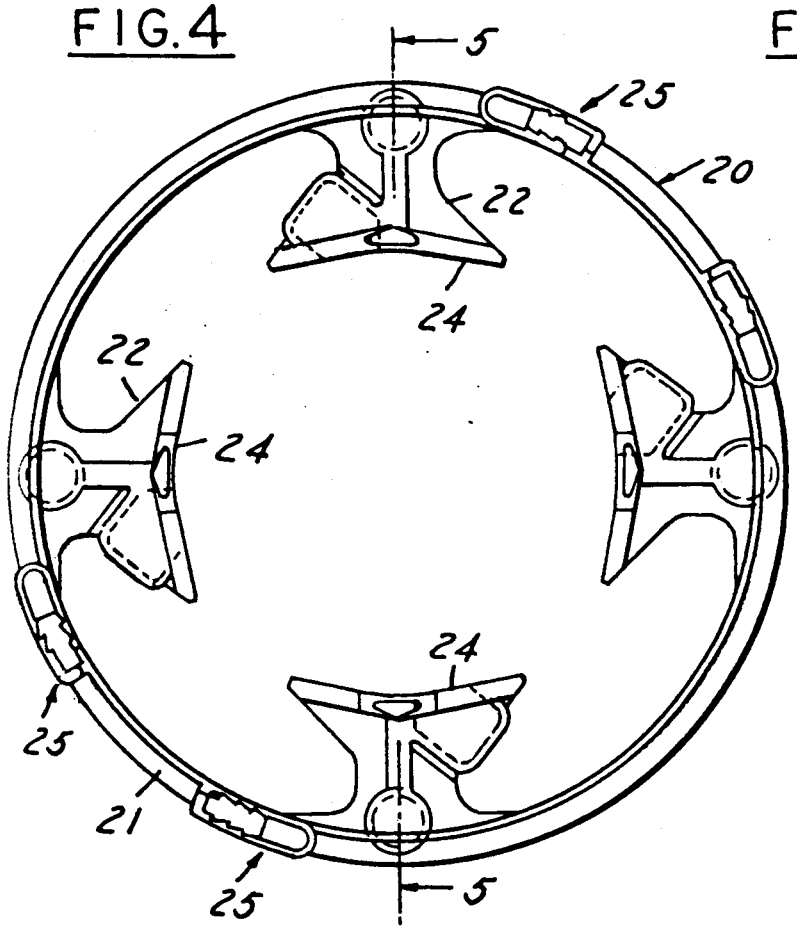
FIG. 4 is an end view view of a plastic stator end member utilized in the motor.
Figure 5:
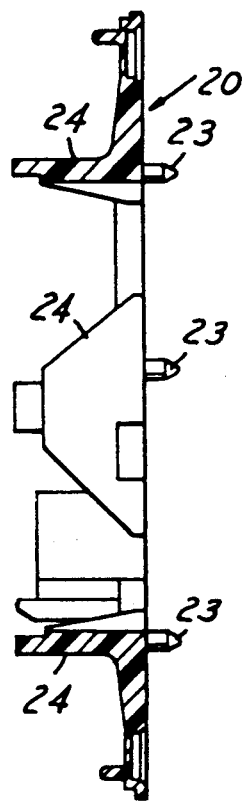
FIG. 5 is a sectional view taken along the line 5—5 in FIG. 4.
Figure 6:
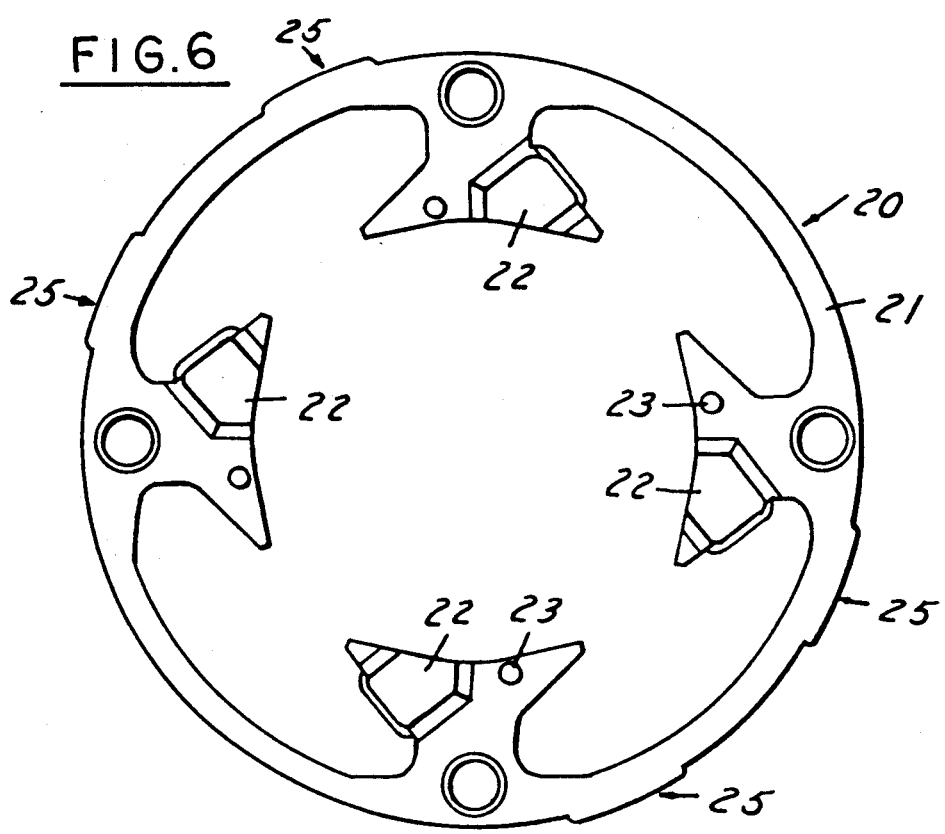
FIG. 6 is an opposite end view of the member shown in FIG. 4.

Referring to FIGS. 1-10, the preferred electric motor embodying the invention may be of the shaded pole type such as shown in U.S. Pat. Nos. 2,827,583, 3,975,654 and 3,567,973, incorporated herein by reference, and of the type disclosed in the aforementioned pending application. The electric motor of such application includes a housing 10 comprising a cylindrical shell (not shown), a stator 12 mounted in the shell and a rotor 13 rotatably mounted between end members (not shown) on the shell.

In accordance with the conventional construction, the stator 12 includes a plurality of pole segments 15 extending radially inwardly and having narrow neck portions intermediate their ends as shown, for example, in the aforementioned United States patents, incorporated herein by reference. A coil 16 is wound around the narrow portion of each segment 15. In the motor shown, four segments are provided and the windings of the coils thereon are interconnected one to the other and, in turn, to leads 17, 18, as presently described, which extend to external wiring through which the stator is energized. Insulating liners may be provided in the slots of the stator.

A plastic stator member 20 at each end of the stator 12 has the same general configuration as the stator 12. More specifically, the member 20 includes a ring 21 and radial portions 22 having substantially the configuration of the pole segments 15, that is, extending radially inwardly and having a narrow neck portion overlying the respective segments. The member 20 further includes axially extending integral pins 23 that engage complementary openings in the stator to locate them circumferentially. Each member 20 further includes an axially extending wall 24 which is generally trapezoidal in configuration and is provided on the inner end of each portion 22 to serve as a guide for the winding of the coils 16 on each segment 15.

The member 20 further includes a plurality of integral strain relief devices 25 extending axially from the ring 21.

As shown in FIGS. 7, 8 and 9, each strain relief portion 25 includes radially spaced inner and outer axially extending walls 26, 27 connected by an integral axially extending wall 28. The inner surfaces of the walls 26, 27 are provided with unsymmetrical teeth 29, 30 which are adapted to grip the insulation on a wire, as presently described.

The plastic stator member 20 is preferably made of polyester.

Although the invention has been described in connection with shaded pole motors, it is also applicable to other types of motors including synchronous and brush type.

In making the connection, for example, to the external coated leads 17, 18, the end of the wire 31 within the coated wire 18 is connected to the lead 32 from the adjacent coil 16 by soldering, crimping or otherwise, herein shown by a crimped member 33 (FIG. 10). The end is then moved axially into the area of juncture of the walls 26, 27, 28 and then the wire 17 is bent so that the wire extends between the teeth 29, 30 and the wire is moved through the space between the radial wall on wall 27 providing a positive engagement of the wire which is sufficient to serve as a strain relief of the leads 17, 18. The angles of the teeth 29, 30 are such that they tend to oppose any force on the leads 17, 19.

In accordance with the invention, a unitary motor overload assembly 40 of the resettable type is provided between a pair of the coils and insulated lead 41 from one of the coils is connected by crimping 42 to the overload assembly 40. The other lead 43 from the adjacent coil is connected by crimping to overload assembly 40.

In accordance with the invention, the lead 43 is a solid conductor lead without insulation and is made of smaller diameter wire which is adequate to operate the motor during normal running or locked rotor condition but is designed to open in the event of a winding failure resulting in higher than normal operating currents in the winding.

Such an arrangement will insure that the motor will stop operating in the event that the overload assembly fails and continues to be in closed condition.

I claim:
1. An electric motor comprising
a stator having a plurality of radially inwardly extending circumferentially spaced polar segments,
a coil wound around each stator segment, and
a unitary motor overload asembly of a resettable type,
a first standard lead extending from one of the coils to said overload assembly,
a second conductor lead extending from another of the coils to said overload assembly,
said second conductor lead having a melting point such that when the motor operates satisfactorily during normal running and locked rotor condition, but when the overload assembly fails in a closed condition, said second conductor lead will open by melting preventing the motor from heating excessively.

2. The electric motor set forth in claim 1 wherein said second conductor lead comprises a wire of smaller diameter than the wire of said standard lead.

* * * * *